(12) United States Patent
Weingord et al.

(10) Patent No.: US 7,056,024 B2
(45) Date of Patent: Jun. 6, 2006

(54) THROUGH HUB OIL FILL AND VENT FOR A FLUID DYNAMIC BEARING MOTOR

(75) Inventors: Jerry Weingord, Scotts Valley, CA (US); James Sidney Lee, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 10/850,776

(22) Filed: May 20, 2004

(65) Prior Publication Data

US 2004/0264819 A1    Dec. 30, 2004

Related U.S. Application Data

(60) Provisional application No. 60/483,029, filed on Jun. 27, 2003.

(51) Int. Cl.
*F16C 32/06* (2006.01)
(52) U.S. Cl. .................................. 384/100; 384/107
(58) Field of Classification Search ............... 384/100, 384/107, 113, 114, 118–120; 310/90; 360/99.08, 360/98.07
See application file for complete search history.

(56) References Cited

U.S. PATENT DOCUMENTS

| | | | | |
|---|---|---|---|---|
| 5,575,355 A | * | 11/1996 | Williams et al. | 384/100 |
| 5,822,846 A | * | 10/1998 | Moritan et al. | 384/115 |
| 6,271,612 B1 | * | 8/2001 | Tanaka et al. | 310/90 |
| 6,733,180 B1 | * | 5/2004 | Nakamura | 384/100 |

* cited by examiner

*Primary Examiner*—Thomas R. Hannon
(74) *Attorney, Agent, or Firm*—Wax Law Group

(57) ABSTRACT

A through hub fill hole and air vent having an enlarged fluid diffusion path is provided for spindle motors. Oil leakage and evaporation from a motor is reduced. In an aspect, oil is retained under conditions of at least a 1000 G shock event. In an aspect, the hub fill hole has a varying diameter and geometry, and is angled, further reducing oil leakage. In an aspect, an additional cavity is employed within the hub, for maintaining rotor rotational balance. The process of filling oil into a spindle motor is made easier from a motor set up and tooling perspective. Removal of the hub and other motor components is not necessary for filling a motor. Large diameter oil fill dispenser heads, subambient and ambient fill processes, and micro dispenser fill processes may be utilized. A measured and controlled amount of oil can be dispensed, reducing variability in the motor filling process.

20 Claims, 6 Drawing Sheets

THROUGH HUB OIL FILL AND VENT FOR A FLUID DYNAMIC BEARING MOTOR

CROSS REFERENCE TO RELATED APPLICATION

This application is based on a provisional application No. 60/483,029, filed Jun. 27, 2003, entitled Through Hub Oil Fill And Vent For Fluid Dynamic Motors, and assigned to the Assignee of this application and incorporated herein by reference.

FIELD OF THE INVENTION

The invention relates generally to spindle motors, and more particularly to filling and venting a fluid dynamic bearing for use with disc drive data storage systems.

BACKGROUND OF THE INVENTION

The recent new environments for usage of disc drive memory systems have intensified design and performance needs including needs for heightened robustness. Besides traditional computing environments, disc drive memory systems are used more recently by devices including digital cameras, digital video recorders, laser printers, photo copiers, jukeboxes, video games and personal music players. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor is known as an in-hub or in-spindle motor, which typically has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

Spindle motors have in the past used conventional ball bearings between the sleeve and the shaft. However, the demand for increased storage capacity and smaller disc drives has led to the design of higher recording area density such that the read/write heads are placed increasingly closer to the disc surface. A slight wobble or run-out in disc rotation can cause the disc to strike the read/write head, possibly damaging the disc drive and resulting in loss of data. Conventional ball bearings exhibit shortcomings in regard to these concerns. Imperfections in the raceways and ball bearing spheres result in vibrations. Also, resistance to mechanical shock and vibration is poor in the case of ball bearings, because of low damping. Vibrations and mechanical shock can result in misalignment between data tracks and the read/write transducer. These shortcomings limit the data track density and overall performance of the disc drive system. Because this rotational accuracy cannot be achieved using ball bearings, disc drives currently utilize a spindle motor having fluid dynamic bearings between a shaft and sleeve to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Hydrodynamic bearings eliminate mechanical contact vibration problems experienced by ball bearing systems. Further, hydrodynamic bearings can be scaled to smaller sizes whereas ball bearings have smallness limitations. However, hydrodynamic bearings suffer from sensitivity to external loads or mechanical shock events. Fluid can in some cases be jarred out of the bearing by vibration or shock events. Further, bearing fluid is susceptible to evaporation over time. Bearing fluids can give off vaporous components that could diffuse into a disc chamber. This vapor can transport particles such as material abraded from bearings or other components. These particles can deposit on the read/write heads and the surfaces of the discs, causing damage to the discs and the read/write heads as they pass over the discs. It is critical to avoid outgassing of contaminants into the sealed area of the head/disc housing.

Proper sealing is critical in the case of hydrodynamic bearings, and efforts have been made to address these problems. A capillary seal is typically employed to ensure fluid is maintained within a bearing. Here, a fluid meniscus is formed between two walls and capillary attraction retains the fluid. However, tests show that recent radial capillary seal designs fail at about 500 Gs of shock, and fluid leaks through fill holes at about 500 Gs of shock. Additionally, mobile applications require higher resilience to shock events than desktop or enterprise products. Laptop or portable computers can be subjected to large magnitudes of mechanical shock as a result of handling. It has become essential in the industry to require disc drives to be capable of withstanding substantial mechanical shock.

Fluid must be accurately filled into the journal gap and bearing. If excessive fluid is loaded into the bearing, the fluid will escape into the surrounding atmosphere landing on the surface of the disc and degrade the performance of the disc drive. If insufficient fluid is loaded into the bearing, then the physical bearing surfaces could contact, leading to increased wear and eventual failure of the bearing system.

Further, current oil fill and air evacuation methods for fluid dynamic bearings are relatively complex and costly due to the often awkward filling angles and tight clearances. It can be difficult to consistently accurately load fluid into the sharp corners of a shield hole. Further, current oil filling methods can leave a considerable amount of excess oil on the surfaces of the sleeve, which must be subsequently removed through an arduous post-cleaning process. The cleaning process can amount to ten percent of the total assembly cost of the motor.

SUMMARY OF THE INVENTION

A through hub oil fill and air vent is provided for spindle motors. Oil leakage and evaporation from a motor is reduced, potentially extending motor life. In an embodiment, the present invention provides for oil retention under conditions of a shock event of at least 1000 G. The present invention may be used with top cover attach motors, additionally providing a more robust motor.

The process of filling oil into a spindle motor is made easier from a motor set up and tooling perspective. In conventional designs, the hub typically is removed or oil fill is performed prior to installation of the hub. Additionally, in an embodiment, bottom shield motor designs can be filled in a normal orientation, rather than filled at an angle or filled in an inverted orientation. Further, the through hub oil fill design allows for use with a relatively large diameter oil jet fill dispenser head, and further allows for subambient fill methods, ambient fill methods, injection fill methods or micro dispenser fill methods. A measured and controlled amount of oil or hydrofluid can therefore be dispensed into the motor, reducing any variability in the motor filling process.

Features of the invention are achieved in part by forming an oil fill and air vent passageway through a hub. As compared to previous designs, a longer oil diffusion path from within the motor is provided. In previous designs, oil is filled through a shield having a fill hole that extends a shorter length than a hub fill hole. The present invention eliminates the shield as a potential oil leakage source by utilizing a shield without a fill or vent hole.

Moreover, as compared to conventional designs, the present invention positions the oil fill passageway a greater distance from the motor oil reservoir, further reducing oil loss. In an embodiment, the hub oil channel and vent hole have a varying diameter and geometry, and can be angled, utilizing centrifugal forces, further reducing oil leakage. In an embodiment, an additional cavity is employed within the hub, substantially opposite the hub oil fill channel, for maintaining rotor rotational balance.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method is described herein for filling and venting a fluid dynamic bearing motor and other spindle motors. By employing a hub having a fill hole and vent hole, oil leakage and oil evaporation is reduced, and the oil filling process is simplified. The present invention is especially useful with motor designs where a shield is employed adjacent to a sleeve having a fluid reservoir therebetween.

It will be apparent that features of the discussion and claims may be utilized with disc drives, low profile disc drive memory systems (including one-inch disc drive designs), spindle motors, various fluid dynamic bearing designs including hydrodynamic and hydrostatic bearings, and other motors employing a stationary and a rotatable component. Further, embodiments of the present invention may be employed with a fixed shaft and a rotating shaft.

As used herein, the terms "axially" or "axial direction" refers to a direction along a centerline axis length of the shaft (i.e., along axis 440 shown in FIG. 4), and "radially" or "radial direction" refers to a direction perpendicular to the centerline length of the shaft.

Figure 1:
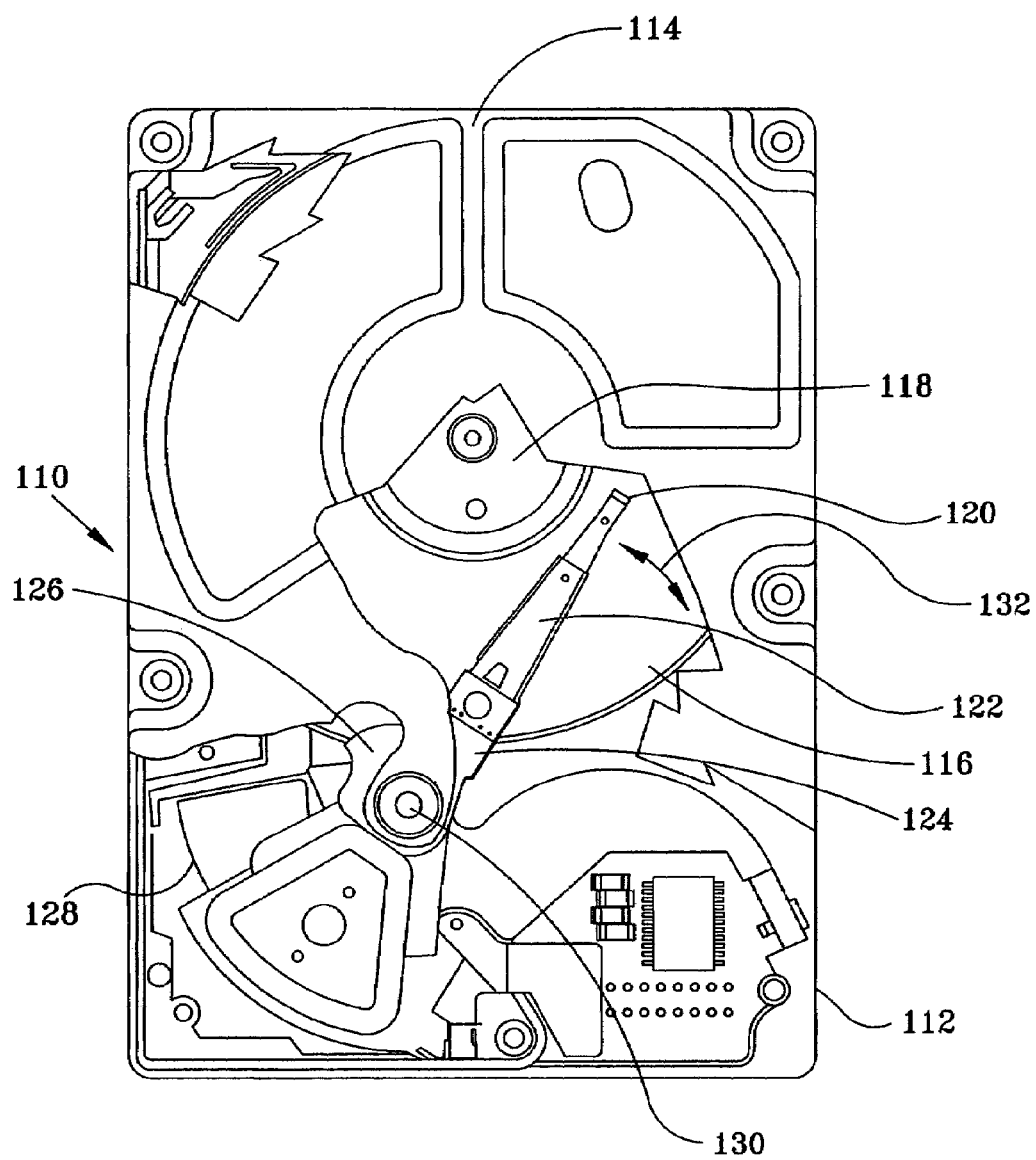
FIG. 1 is a top plan view of a disc drive data storage system in which the present invention is useful, in an embodiment of the present invention.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
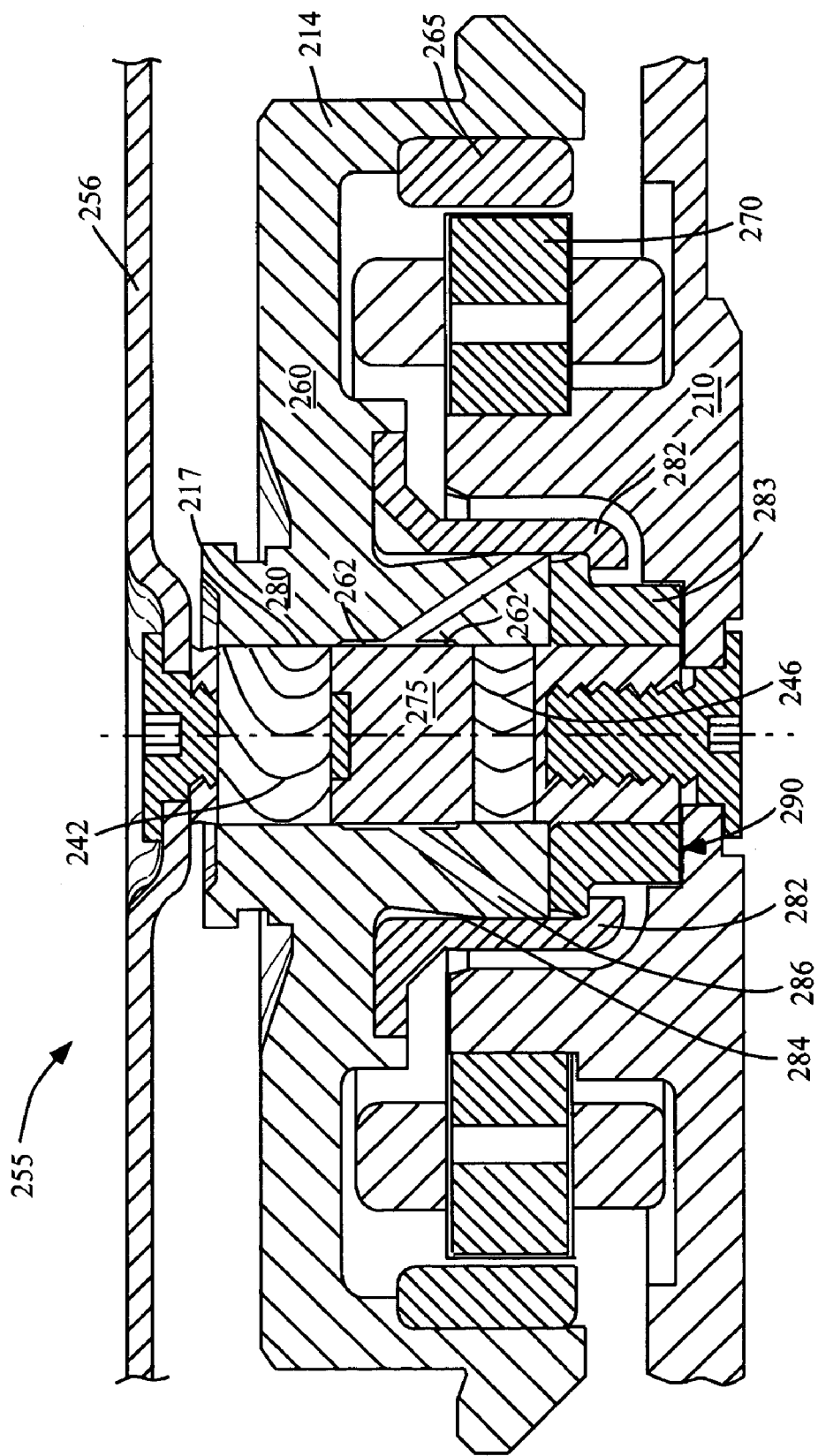
FIG. 2 is a sectional side view of a hydrodynamic bearing spindle motor with a rotating hub and an attached shield, in which the present invention is useful.

FIG. 2 is a sectional side view of a hydrodynamic bearing spindle motor 255 used in disc drives 110 in which the present invention is useful. Again, the present invention is not limited to use with a hydrodynamic spindle motor design of a disc drive, which is shown only for purposes of example. Typically, spindle motor 255 includes a stationary component and a relatively rotatable component, defining a journal gap there between. The stationary component includes shaft 275 that is fixed and attached to base 210. In an embodiment, shaft 275 is attached to top cover 256, providing stability to shaft 275 and improving dynamic performance. Thus, in a fixed shaft motor, both upper and lower ends of shaft 275 can be fastened to base 210 and to top cover 256 of the housing, so that the stiffness of the motor and its resistance to shock as well as its alignment to the rest of the system is enhanced.

The rotatable components include sleeve 280 and hub 260 having one or more magnets 265 attached to a periphery thereof. The magnets 265 interact with a stator winding 270 attached to the base 210 to cause the hub 260 to rotate. Magnet 265 can be formed as a unitary, annular ring or can be formed of a plurality of individual magnets that are spaced about the periphery of hub 260. Magnet 265 is magnetized to form one or more magnetic poles.

The hub 260 is supported on a shaft 275 having a thrust plate 283 on one end. Thrust plate 283 can be an integral part of the shaft 275, or it can be a separate piece that is attached to the shaft, for example, by a press fit. Thrust plate 283 engages with base 210 at interface 290. Hub 260 includes a disc carrier member 214, which supports disc pack 116 (shown in FIG. 1) for rotation about shaft 275. Disc pack 116 is held on disc carrier member 214 by disc clamp 118. Hub 260, positioned for rotation about shaft 275, is situated adjacent to shaft 275 across journal bearing 262. A fluid, such as lubricating oil or a ferromagnetic fluid fills interfacial regions between shaft 275 and sleeve 280, thrust plate 283 and sleeve 280, thrust plate 283 and shield 282, and between shield 282 and sleeve 280. While the present figure is described herein with a lubricating fluid, those skilled in the art will appreciate that useable fluids include a lubricating liquid and gas.

Typically, one of shaft 275 and sleeve 280 includes sections of pressure generating grooves, including asymmetric grooves 242, and symmetric grooves 246. Asymmetric grooves 242 and symmetric grooves 246 having a pattern including one of a herringbone pattern and a sinusoidal pattern induces fluid flow in the interfacial region and generates a localized region of dynamic high pressure and radial stiffness. As sleeve 280 rotates, pressure is built up in each of its grooved regions and shaft 275 supports hub 260 for constant high speed rotation.

Figure 4:
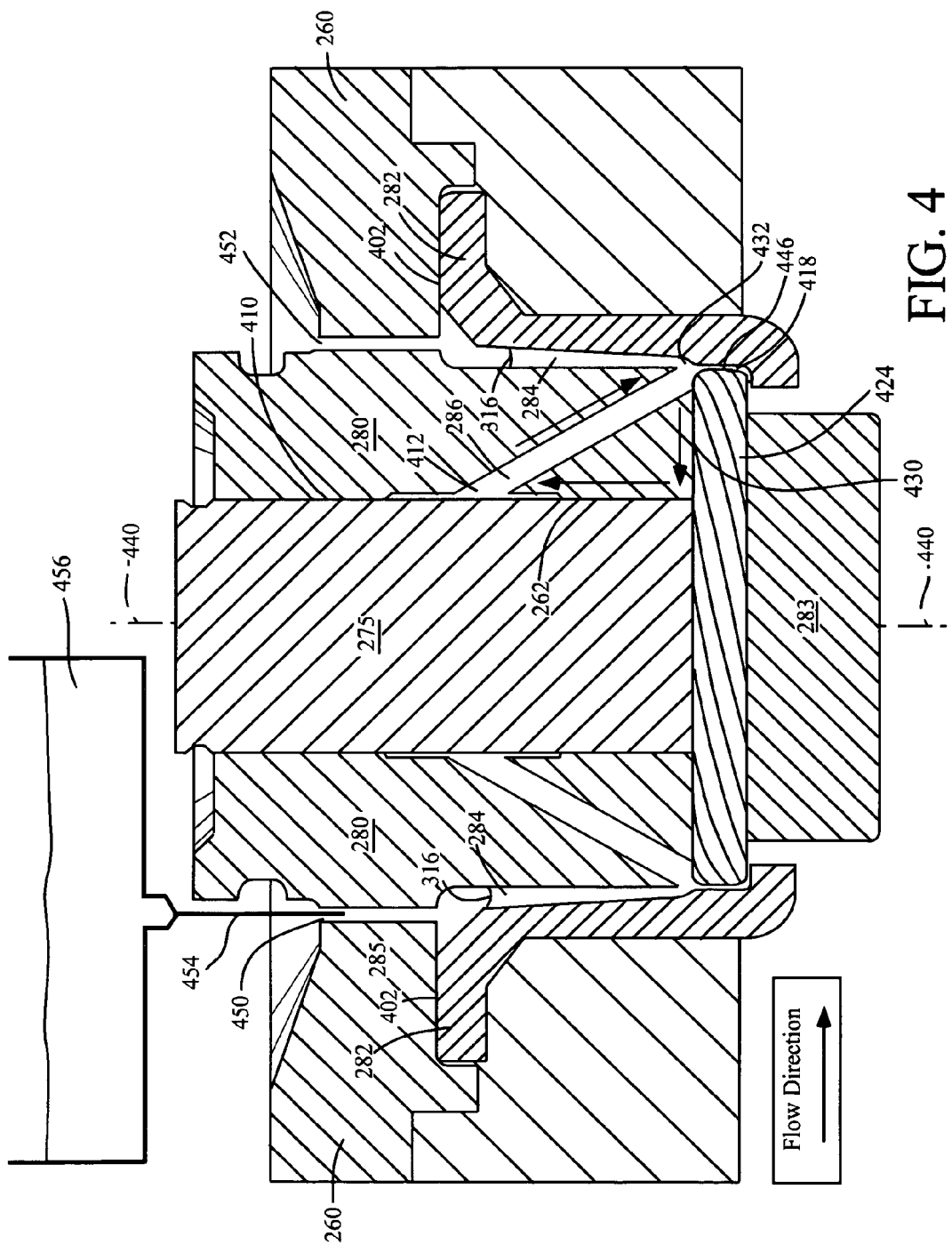
FIG. 4 is a further sectional side view of the hydrodynamic bearing spindle motor of FIG. 2, with an enlarged view of the hub and shield illustrating a fluid fill hole through the hub, in an embodiment of the present invention.
Figure 5:
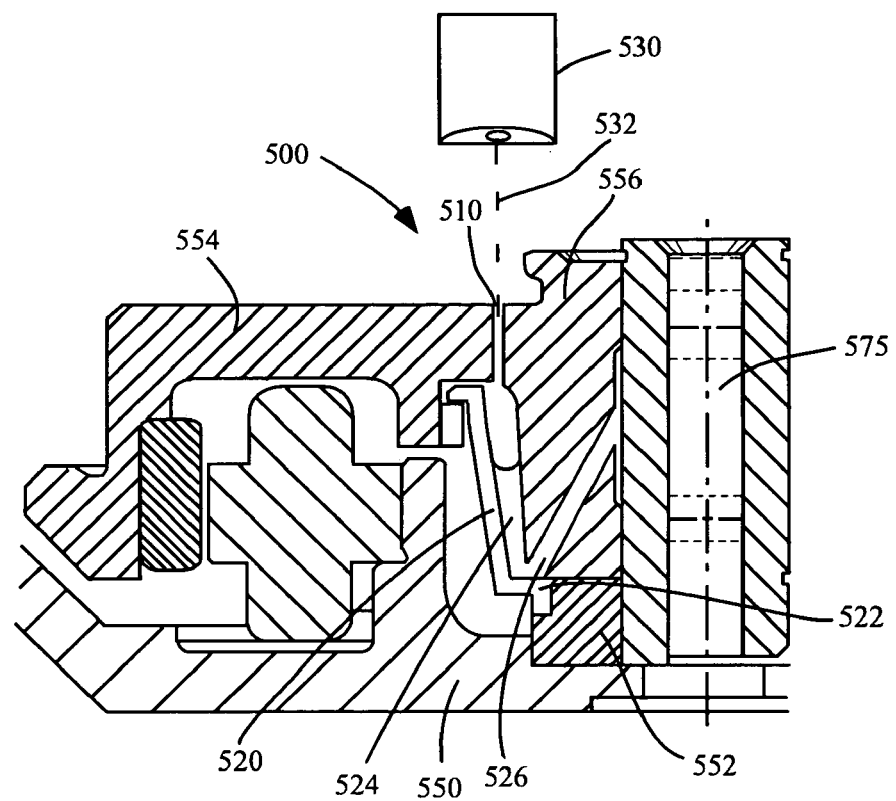
FIG. 5 is a hydrodynamic bearing spindle motor with a shield attached to a thrust plate, in which the present invention is additionally useful.

A Shield 282 is radially self-aligned into sleeve 280. On one end (adjacent to thrust plate 283) sleeve 280 locates shield 282 radially, and on another end shield 282 is attached to hub 260 (i.e., laser welded). A constant gap of about 20 to 30 microns is formed between thrust plate 283 and shield 282. A fluid reservoir 284 is formed between shield 282 and sleeve 280. Embodiments of the present invention can be utilized with motor designs wherein shield 282 is attached to hub 260, or alternatively wherein shield 282 is attached to thrust plate 283, as shown in FIG. 5. A fluid recirculation path (sleeve passageway 286) is formed through sleeve 280 to pass and recirculate fluid through journal bearing 262. Sleeve passageway 286 is positioned such that one end is placed generally adjacent to a midpoint along shaft 275 and a second end joins recirculation plenum 432 (shown in FIG. 4) such that, in one situation, fluid and air may travel along channels on shield 282 toward and along fluid reservoir 284.

Figure 3:
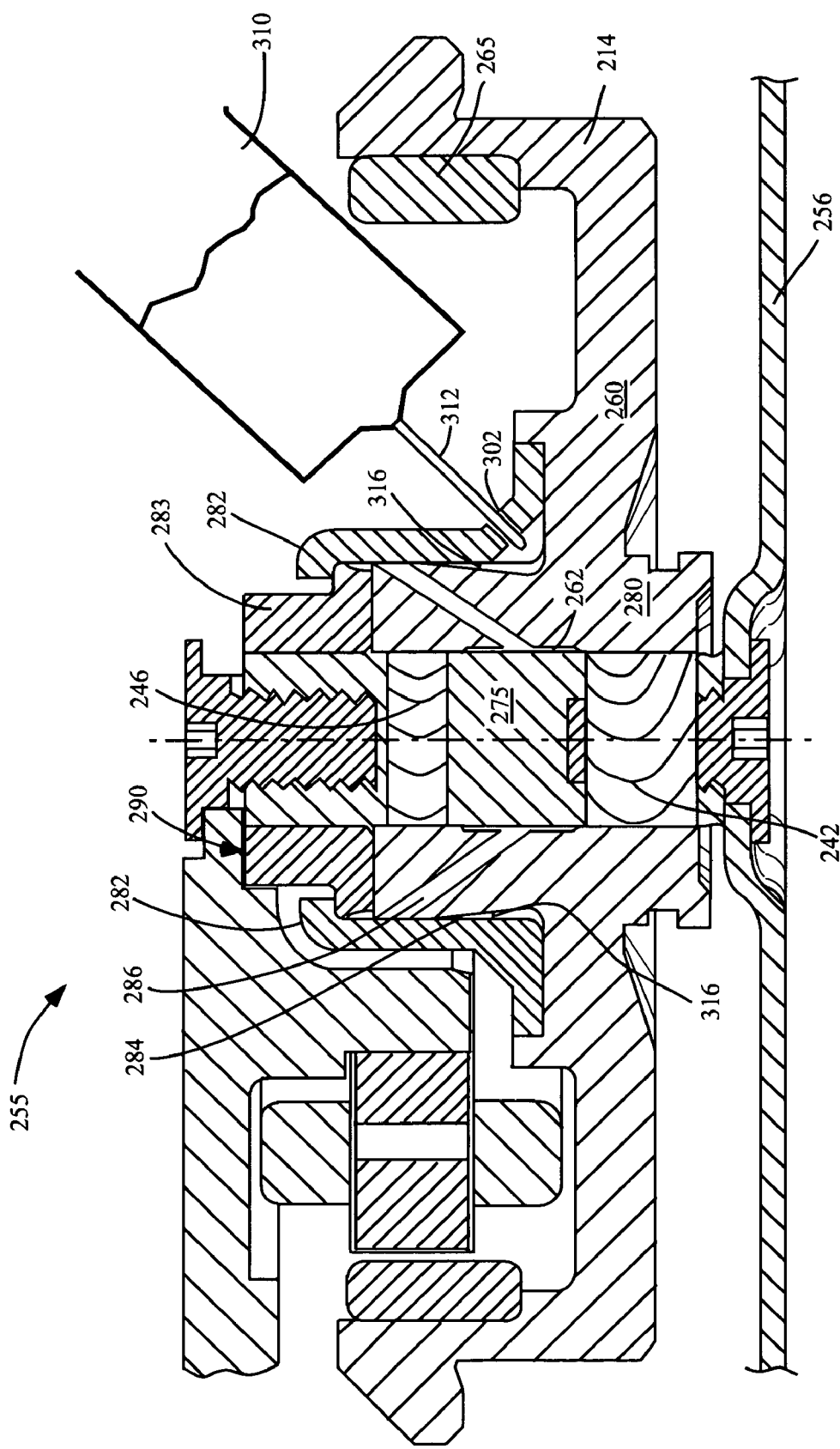
FIG. 3 is another sectional side view of the hydrodynamic bearing spindle motor of FIG. 2, illustrating a previously employed fluid filling method through a shield.

FIG. 3 shows a fluid fill hole previously employed with a fluid dynamic bearing motor design. As illustrated, fluid fill hole 302 is formed through shield 282. The length of fluid fill hole 302 is determined by the distance across shield 282. In some cases, a shorter length fill hole is more vulnerable to leakage and evaporation, as well as to a shock event. As shown in FIG. 4, the present invention provides a longer fluid fill hole 450 than previous designs. Further, fluid fill hole 302 is positioned closer to fluid and a fluid meniscus 316 situated in fluid reservoir 284, as compared to fluid fill hole 450 of the present invention as shown in FIG. 4. Therefore, fluid fill hole 302 presents an added opportunity, by reason of closer proximity to a fluid situated in fluid reservoir 284, for loss of fluid out the fill hole.

Fluid fill and air evacuation processes for fluid dynamic bearings can be relatively complex and costly due in part to the often awkward filling angles and tight clearances. Further, positioning of a spindle motor for fluid filling can be complicated by gravitational effects, thus requiring abnormal or restrictive filling orientations. As shown on the right half of FIG. 3, components including base 210 are absent in order to position a filling apparatus 310 and filler extension 312 within fluid fill hole 302. Base 210 and additional components must be removed or the components installed subsequent to filling fluid into spindle motor 255. A tight filling angle exists and is apparent from the illustrated angle of filling apparatus 310 in FIG. 3, even with a number of components removed.

Referring to FIG. 4, another sectional side view of the hydrodynamic bearing spindle motor of FIG. 2 is shown, with an enlarged view of components for focusing on components near fill hole 450 and fluid reservoir 284. Due to a lower flow resistance and lower pressure in fluid reservoir 284, compared with other fluid containing areas, fluid is received and retained within fluid reservoir 284 during operating or non-operating shock events. When the motor is spinning and forcing fluid by centrifugal force from reservoir 284, pumping grooves 424 on thrust plate 283 generate pumping pressure and drive fluid recirculation through the motor. However, when the motor is not spinning and centrifugal force subsides, or during shock events, reservoir 284 can receive fluid from areas including the outer diameter gap 446 of thrust plate 283 and from the journal between shaft 275 and sleeve 280.

Grooved pumping is employed along the inside diameter (ID) and the outside diameter (OD) of thrust plate 283. In the case of the ID, spiral pumping grooves 424 generate pumping pressure to drive fluid recirculation and to pump fluid from thrust plate bearing passageway (adjacent to the thrust plate ID) toward shaft 275, into the journal bearing 262, when shaft 275 and sleeve 280 are in relative rotational motion. In an embodiment, when the motor is spinning, the fluid flow direction is inward from the bearing of the thrust plate ID 430, along the journal bearing 262 to journal plenum 412, through sleeve passageway 286, to recirculation plenum 432 and then returning to the bearing of the thrust plate ID 430. Recirculation plenum 432 is defined by a junction joining fluid reservoir 284, sleeve passageway 286, thrust plate ID 430 and thrust plate OD gap 346. The fluid flow direction, in an example, is illustrated by solid lines shown in FIG. 3. A grooved pumping seal (GPS) 418 is employed in outer diameter gap 446 defined between shield 282 and an OD of thrust plate 283. GPS 418 pumps fluid from outer diameter gap 446 serving to prevent fluid leakage from the motor. Further, a centrifugal capillary seal (CCS) 316 is employed between sleeve 280 and shield 282. In an embodiment, the adjacent surfaces of shield 282 and sleeve 280 have relatively tapered surfaces that converge toward recirculation plenum 432. A meniscus 316 is formed between the tapered surfaces, and fluid within reservoir 284 is forced toward recirculation plenum 432 by centrifugal force when shaft 275 and sleeve 280 are in relative rotational motion.

An embodiment of the present invention is illustrated by fill hole 450 and balancing hole 452. Fill hole 450, being extended, withstands a shock event and prevents any fluid from leaking, evaporating or wicking from the motor. That is, fill hole 450 being formed through hub 260 has a longer length than previous fill hole designs through shield 282, hub 260 having a greater length than shield 282 for forming a fill hole. As spindle motor 255 proceeds through operational cycles, fluid is better retained with an extended fluid fill hole 450, especially during an air purge cycle. Fill hole 450 provides a longer oil diffusion path from within the motor, extending motor life through improved fluid retainment. In an embodiment, the extended fill hole 450 provides for oil retention under conditions of a shock event of at least 1000 G.

Further, fluid fill hole 450 is positioned a greater distance from fluid and a fluid meniscus situated in fluid reservoir 284, as compared to fluid fill hole 302 of previous designs as shown in FIG. 3. Therefore, fluid fill hole 450 further reduces a chance for fluid loss out a fill hole by reason of greater distance from fluid situated in fluid reservoir 284.

Shield 282, forming a sealed location, is attached to sleeve 280 at attachment location 402, in an embodiment of the invention. Fill hole 450 is positioned adjacent to attachment location 402. Fill hole 450 is positioned without making an angle with a surface of hub 260. In another embodiment, fill hole 450 is positioned to make a 30 degree angle or an alternative angle with a surface of hub 260. An angled fill hole opposes escape of fluid during shock since the fluid follows a path of least resistance and an angled fill hole presents greater resistance in comparison to capillary force gradients. In an embodiment, fill hole 450 is angled through hub 260 toward shaft 275 such that when the motor is spinning, centrifugal force aids to retain fluid. Further, the thickness of hub 260 supports various angles and geometries for fill hole 450. In an embodiment, fill hole 450 is positioned between channels formed on shield 282 (not shown).

Fill hole 450 (also an air vent hole) provides a means to fill a fluid dynamic bearing with fluid by injecting a predetermined amount of fluid into fill hole 450 above capillary seal 316. In an embodiment, fill hole 450 supports both ambient fluid fill and subambient fluid fill processes for dispensing fluid to spindle motor 255. In an ambient fill process, fluid is dispensed through, for example, a high precision, neumatically controlled syringe. In a subambient fill process, the fluid dynamic bearing is under vacuum and the fluid is dispensed. Fluid volume is controllable through these fill processes, which is critical for issues including performance and motor life in the case of hydrodynamic bearing spindle motor 255.

Fluid fill hole 450 allows fluid filling the motor with hub 260, base 210 and other components in place. Further, fluid fill hole 450 allows spindle motors, including bottom shield motors to be fluid filled in a normal orientation, rather than an angled fluid fill process with an inverted spindle motor orientation as in previous designs such as that shown in FIG. 3. Further, added space for positioning a fluid dispenser head is provided with the fluid fill hole 450 as compared to previous designs shown in FIG. 3. As shown, in an embodiment of the present invention, filling apparatus 456 is positioned over the top of the spindle motor, the spindle motor being in a normal orientation, and spindle motor components including the base being previously installed and present during the fill process. Further, filling apparatus 456 is positioned in a non-angled orientation over the spindle motor and filling extension 454 is inserted into fluid fill hole 450.

FIG. 5 shows a further embodiment of the invention wherein spindle motor 500 employs a shield 520 attached to thrust plate 552, attached at shield attachment 522. Hub 554 and sleeve 556 rotate relative to stationary shield 520, stationary shaft 575 and base 550. As in previously discussed spindle motor designs, a fluid recirculation path, including sleeve passageway 526, is formed through sleeve 556 to pass and recirculate fluid through the journal bearing. Also, a fluid reservoir 524 is formed between shield 520 and sleeve 556.

Fill hole 510 (or air vent hole) provides a means to fill the fluid dynamic bearing motor with fluid. Similar advantages as discussed above are provided by the positioning of fill hole 510 through hub 554, including an extended fill hole, reduced oil leakage and evaporation from the motor, as well as a simplified oil filling process.

In an embodiment, fill hole 510 further supports a micro dispenser system including a MicroDrop™ fluid fill process, which fills a predetermined volume of fluid with a tightly controlled volume tolerance for spindle motor designs. The MicroDrop™ fill process utilizes a nozzle 530 with a frequency controlled electric element for controlling fluid drop volume (i.e., droplets of 30 µm to 100 µm). Fluid 532 is dispensed from the MicroDrop™ process on an individual droplet sequence and drops are expelled and fly at a velocity of 1.5 to 3 meters per second or more. Thus, fluid from the MicroDrop™ process may be dispensed from a distance, rather than requiring embedding a syringe into the fluid reservoir of the spindle motor. The MicroDrop™ process offers a further advantage by expelling fluid from a non-contact nozzle, rather than from a syringe. With a syringe having a fluid adhering surface, a fluid drop can be undesirably removed from a spindle motor and contaminate areas outside a fluid reservoir.

Figure 6:
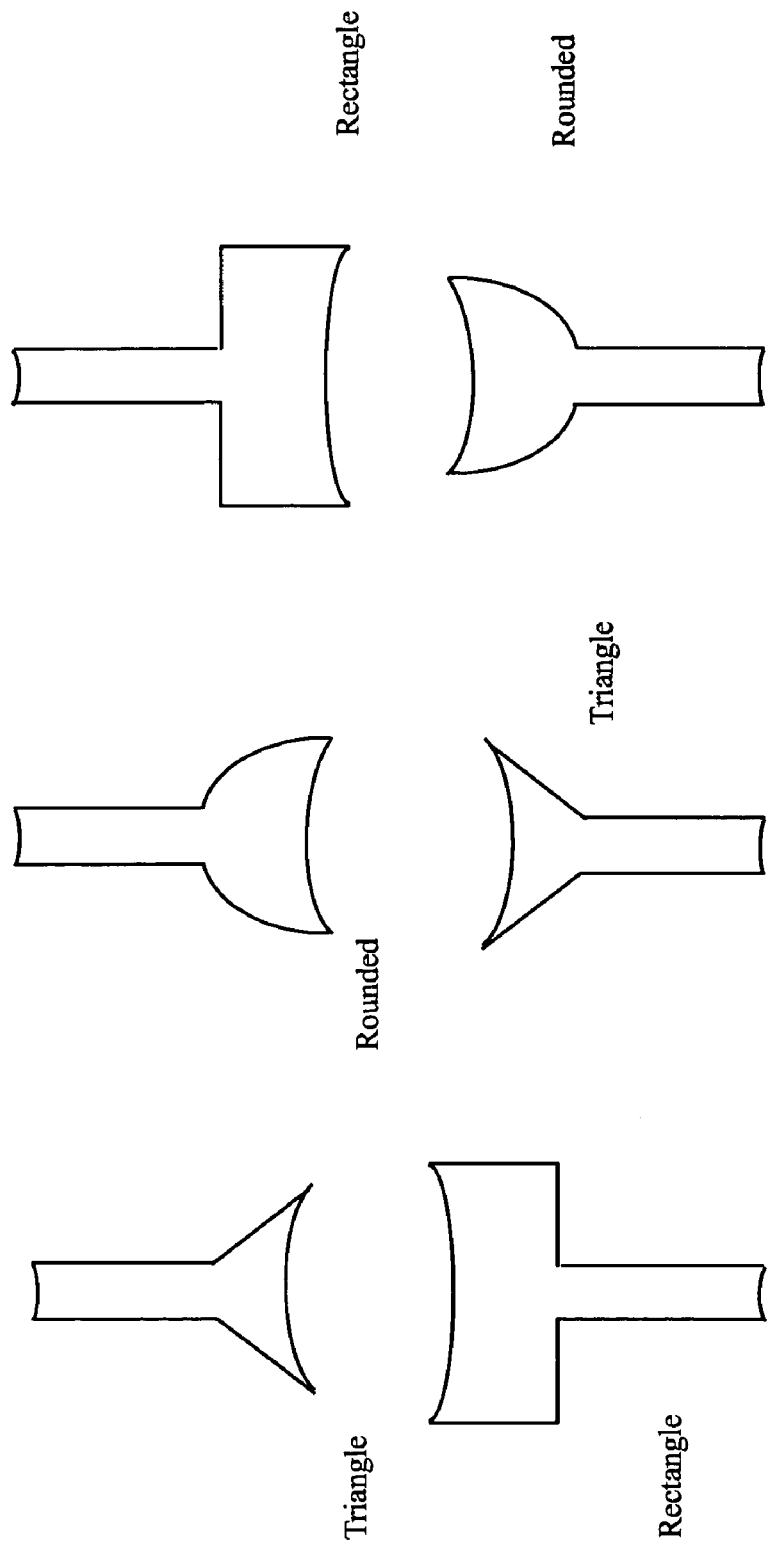
FIG. 6 illustrate various diameters and geometries that can be utilized for a fluid fill hole and a balancing hole, in an embodiment of the present invention.

Referring to FIG. 6, various diameters and geometries may be utilized for fluid fill hole 450 and balancing hole 452. Additionally, in an embodiment, two fill holes are employed through hub 260, and it is to be appreciated that additional numbers of fill hole 450 and balancing hole 452 can be utilized. The through passageway as described herein is one of a fluid fill-hole and an air vent. The various geometries or shapes for fluid fill hole 450 include a rounded end, a rectangular end, and a triangular end, with a smaller diameter passageway extended through hub 260 to the opposite end. It is to be appreciated that the diameter of both fluid fill hole 450 and balancing hole 452 can be varied through the length of hub 260 or can remain a constant diameter. In an embodiment, balancing hole 452 is similarly shaped as fluid fill hole 450. Balancing hole 452 can either form an opening completely through hub 260 or be formed some length into hub 260 without making an opening completely through hub 260. In an embodiment, balancing hole 452 is employed for rotor rotational balance.

Further, in an embodiment, fluid fill hole 450 is shaped such that a narrow passageway is positioned distant to the fluid reservoir 284, and a geometry such as a rounded end is positioned adjacent to the fluid reservoir 284. This allows any air bubble to burst into the rounded end to retain residual fluid, rather than burst externally from the motor.

Other features and advantages of this invention will be apparent to a person of skill in the art who studies this disclosure. For example, those skilled in the art will appreciate that features of the present invention allows various fluid filling processes including the MicroDrop™ fluid dispenser process. Further, fill hole 450 and balancing hole 452, having an extended length and allowing various diameters and geometries, may be utilized to provide rotational balance where rotational balance difficulties arise with a spindle motor. Thus, exemplary embodiments, modifications and variations may be made to the disclosed embodiments while remaining within the spirit and scope of the invention as defined by the appended claims.

We claim:

1. A spindle motor comprising:
   a rotatable component defining a journal gap and relatively rotatable with a stationary component, the journal gap containing fluid;
   a sleeve affixed to the rotatable component;
   a shield affixed to one of the rotatable component and the stationary component, extending substantially axially along the sleeve, defining a fluid reservoir with the sleeve; and
   a hub affixed to the rotatable component defining a through passageway for filling fluid and expelling air therethrough.

2. The spindle motor as in claim 1, wherein the hub further comprises a balancing passageway formed therein for maintaining rotor balance.

3. The spindle motor as in claim 2, wherein the balancing passageway comprises at least one of a varying diameter and a varying geometry.

4. The spindle motor as in claim 1, wherein the through passageway comprises at least one of a varying diameter and a varying geometry.

5. The spindle motor as in claim 1, wherein the through passageway forms an angle with a radial surface of the hub.

6. The spindle motor as in claim 1, wherein the shield is attached to one of the hub and a thrust surface, the thrust surface attached to a shaft, the shaft attached to the stationary component.

7. The spindle motor as in claim 1, wherein the stationary component comprises a shaft affixed to a base and to a top cover plate.

8. The spindle motor as in claim 1, further comprising a centrifugal capillary seal defined between the shield and the sleeve, the shield and the sleeve having surfaces relatively tapered and converging toward a recirculation plenum, wherein fluid in the fluid reservoir is forced toward the recirculation plenum, into the journal gap via an axial end of the sleeve and then through a sleeve recirculation passageway by centrifugal force when the stationary component and the sleeve are in relative rotational motion, the recirculation plenum defined by a junction joining the fluid reservoir, the axial end of the sleeve and the sleeve recirculation passageway, and the sleeve recirculation passageway formed through the sleeve for recirculating fluid through the journal gap.

9. A fluid dynamic bearing system comprising:
   a rotatable component defining a journal gap and relatively rotatable with a stationary component, the journal gap containing fluid;
   a data storage disc attached to the rotatable component;
   an actuator supporting a head proximate to the data storage disc for communicating with the data storage disc;
   a sleeve affixed to the rotatable component;
   a shield affixed to one of the rotatable component and the stationary component, extending substantially axially along the sleeve, defining a fluid reservoir with the sleeve; and
   a hub affixed to the rotatable component defining a through passageway for filling fluid and expelling air therethrough.

10. The fluid dynamic bearing system as in claim 9, wherein the hub further comprises a balancing passageway formed therein for maintaining rotor balance.

11. The fluid dynamic bearing system as in claim 10, wherein the balancing passageway comprises at least one of a varying diameter and a varying geometry.

12. The fluid dynamic bearing system as in claim 9, wherein the through passageway comprises at least one of a varying diameter and a varying geometry.

13. The fluid dynamic bearing system as in claim 9, wherein the through passageway forms an angle with a radial surface of the hub.

14. The spindle motor as in claim 9, wherein the shield is attached to one of the hub and a thrust surface, the thrust surface attached to a shaft, the shaft attached to the stationary component.

15. The fluid dynamic bearing system as in claim 9, wherein the stationary component comprises a shaft affixed to a base and to a top cover plate.

16. In a spindle motor having a journal defined between a relatively rotatable component and a stationary component, the journal containing fluid, a method comprising:
   affixing a sleeve to the rotatable component;
   affixing a shield to one of the rotatable component and the stationary component, extending substantially axially along the sleeve, and defining a fluid reservoir with the sleeve;
   affixing a hub to the rotatable component; and
   forming a through passageway through the hub to fill fluid and expel air therethrough.

17. The method as in claim 16, further comprising forming a balancing passageway into the hub to maintain rotor balance.

18. The method as in claim 17, further comprising forming the balancing passageway having at least one of a varying diameter, varying geometry and an angle with a radial surface of the hub.

19. The method as in claim 16, further comprising forming the through passageway having at least one of a varying diameter, varying geometry and an angle with a radial surface of the hub.

20. The method as in claim 16, further comprising utilizing one of an ambient fill process, subambient fill process, an injection fill process, and a micro dispenser fill process to fill the fluid into the journal.

* * * * *